No. 636,540. Patented Nov. 7, 1899.
S. E. LOUDEN.
DEVICE FOR HOLDING LAWN MOWER CUTTERS FOR SHARPENING.
(Application filed July 29, 1899.)
(No Model.) 2 Sheets—Sheet 1.
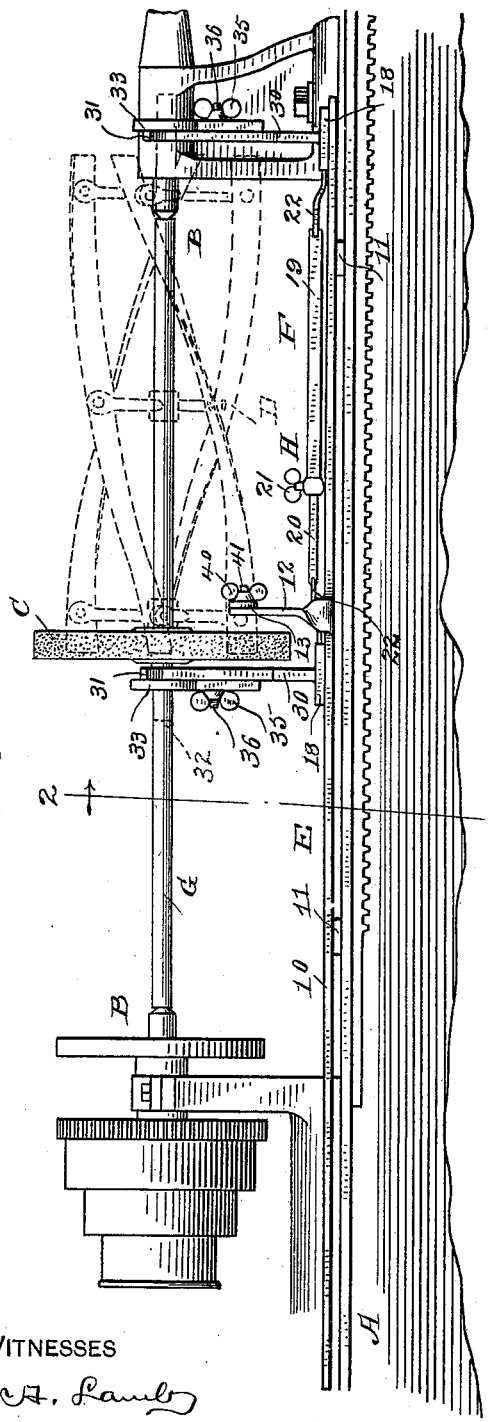
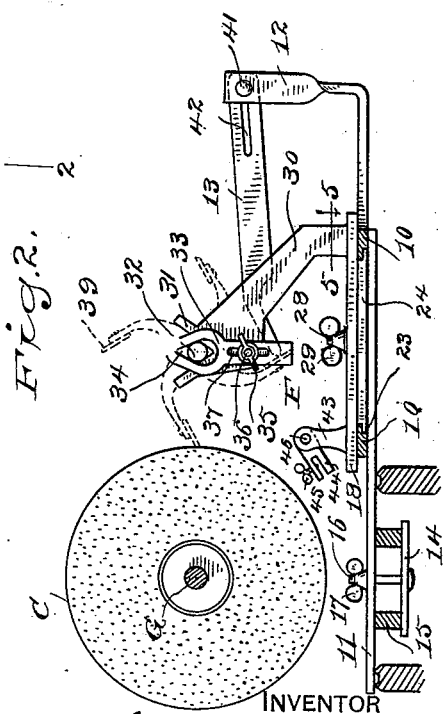
WITNESSES
INVENTOR
Samuel E. Louden
By A. M. Wooster
Atty.

No. 636,540. Patented Nov. 7, 1899.
S. E. LOUDEN.
DEVICE FOR HOLDING LAWN MOWER CUTTERS FOR SHARPENING.
(Application filed July 29, 1899.)
(No Model.) 2 Sheets—Sheet 2.
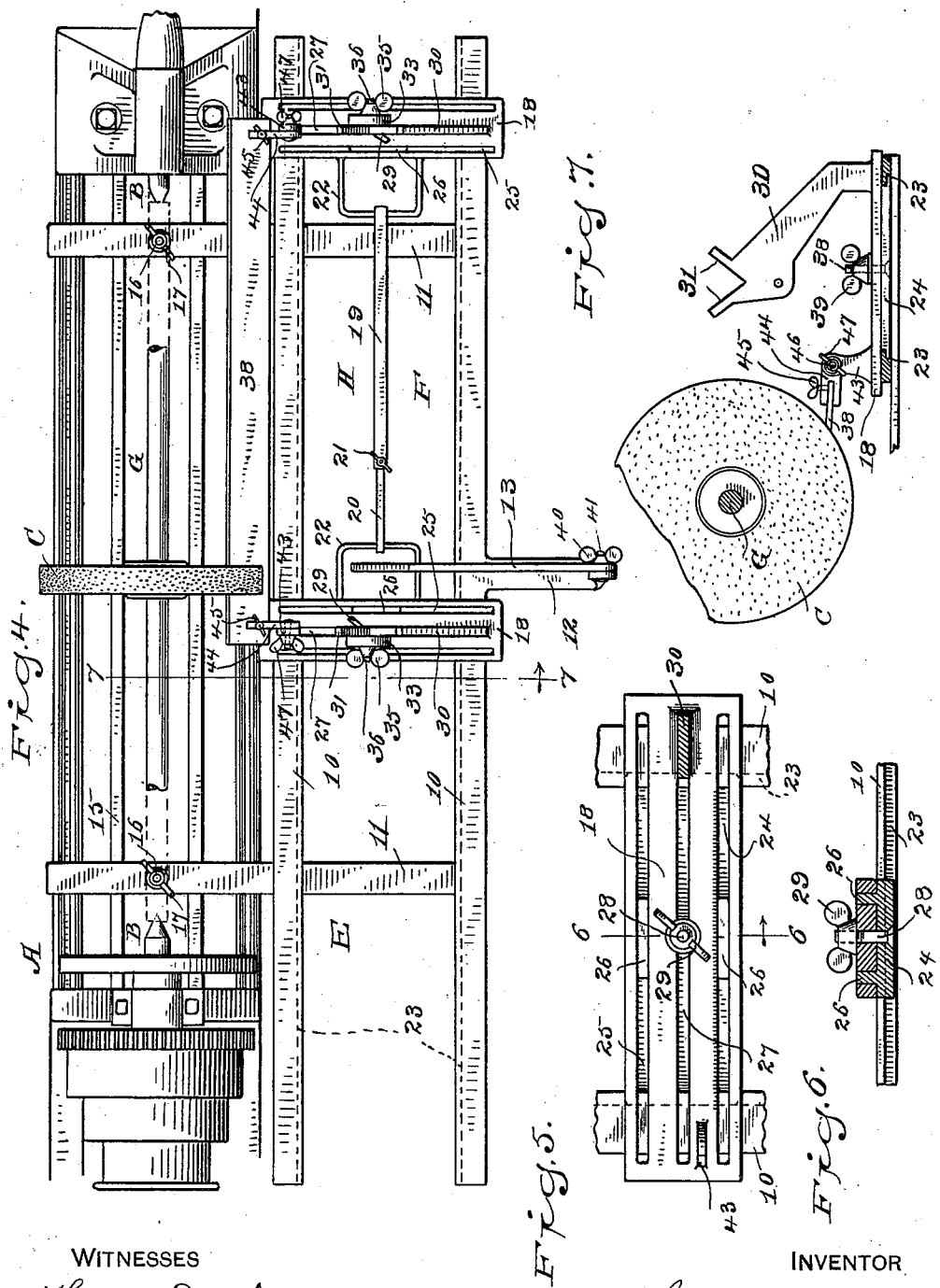
WITNESSES
INVENTOR
Samuel E. Louden
By A. V. Wooster, atty

UNITED STATES PATENT OFFICE.

SAMUEL E. LOUDEN, OF RIVERSIDE, CONNECTICUT.

DEVICE FOR HOLDING LAWN-MOWER CUTTERS FOR SHARPENING.

SPECIFICATION forming part of Letters Patent No. 636,540, dated November 7, 1899.

Application filed July 29, 1899. Serial No. 725,518. (No model.)

*To all whom it may concern:*

Be it known that I, SAMUEL E. LOUDEN, a citizen of the United States, residing at Riverside, county of Fairfield, State of Connecticut, have invented a new and useful Device for Holding Lawn-Mower Cutters for Sharpening, of which the following is a specification.

My invention has for its object to provide a device for holding lawn-mower cutters for sharpening, which may be used as an attachment for an ordinary lathe, the grinding-wheel being held by the lathe-centers, or may be placed upon any suitable table or bench and used in connection with an ordinary grinding-wheel, the device as a whole being simple and inexpensive to produce, easy to manipulate, durable, and practically impossible to get out of repair, adapted to receive all sizes and styles of lawn-mower cutters, and accurate in use, so that the cutting edges are at all times retained in proper relation to the grinding-wheel, thereby effecting a great saving of time.

With these ends in view I have devised the simple and novel lawn-mower cutter-holding device of which the following description, in connection with the accompanying drawings, is a specification, reference characters being used to indicate the several parts.

Figure 1 is a side elevation illustrating the use of my novel holding device in connection with an ordinary lathe, a portion only of the bed and the centers of the lathe appearing in the drawings, the revoluble cutter-holder appearing in dotted lines; Fig. 2, a section on the line 2 2 in Fig. 1; Fig. 3, a similar view, certain of the parts being removed in order to show more clearly the manner in which the cutters are held up to the grinding-wheel as the carriage is reciprocated; Fig. 4, a plan view corresponding substantially with Fig. 1 and showing the manner in which the stationary straight cutter is held while being sharpened; Fig. 5, an enlarged detail plan view, an arm being in section on the line 5 5 in Fig. 2; Fig. 6, a section on the line 6 6 in Fig. 5; and Fig. 7 is a detail sectional view on the line 7 7 in Fig. 4, illustrating the manner in which the straight stationary cutter is sharpened.

A denotes the bed or frame of a lathe; B, lathe-centers; C, a grinding-wheel, and D the revoluble cutter-holder of a lawn-mower.

My novel cutter-holder comprises, essentially, a frame E, adapted for attachment in any suitable position for use—as, for example, to the bed of a lathe—and F a sliding carriage adapted to be moved freely thereon by hand. The special design or construction of either frame or carriage is not of the essence of my invention, but may be varied to an almost unlimited extent to adapt the device for use under different conditions. It is deemed sufficient for the purposes of this specification to illustrate the application of my invention to a lathe, the centers B of the lathe being utilized to carry the grinding-wheel, which is fixed to a shaft G.

In the drawings I have shown the frame E of my novel cutter-holder as consisting of longitudinal strips 10, cross-pieces 11, and an arm 12, which extends outward and upward from the frame and to which the cutter-guide 13 is adjustably secured. I have shown the frame as secured to the bed of the lathe by means of plates 14, which engage the under side of longitudinal bars 15, which comprise a portion of bed or frame A. (See Fig. 2.) Bolts 16 extend upward through plates 14 and cross-pieces 11 and between longitudinal bars 15 and are engaged by thumb-nuts 17, thus providing for the quick and convenient attachment of my novel cutter-holder to a lathe or its removal therefrom. I have shown the sliding carriage as consisting of two cross-pieces 18, which rest and slide freely upon longitudinal strips 10 and are connected by an adjustable tie-bar H. This tie-bar consists of a tubular part 19, a part 20, adapted to slide within part 19, a set-screw 21 for locking the two parts together, and U-shaped arms 22, by which parts 19 and 20 are connected to cross-pieces 18. The construction of cross-pieces 18 and the manner in which they are held in position upon longitudinal strips 10 of frame E are clearly illustrated in Figs. 2, 5, 6, and 7. The strips 10 are provided with undercut ways 23, which are engaged by the correspondingly-shaped ends of blocks 24, which lie between strips 10 and under cross-pieces 18. These cross-pieces are provided with slots 25, which are engaged by lugs 26 upon the blocks, and with a central slot 27, through which a bolt 28 passes. This bolt is cast into or otherwise made solid with the block 24 and has at its upper end a thumb-nut 29, whereby the parts are locked together. It will be readily understood from Figs. 4 and 5 that by loosening the two thumb-nuts 29 the sliding carriage may be moved laterally relatively to the strips 10 and longitudinally relatively to blocks 24, thus enabling me to adjust the cutters toward or from the grinding-wheel, as may be required in use, the lugs 26 serving as guides for the cross-pieces and insuring free movement in either direction.

30 denotes arms which extend upward from cross-pieces 18 and are provided with rests 31 to receive the shaft 32 of revoluble cutter-holder D.

33 denotes slides adapted to move vertically on arms 30 and provided with oval eyes 34, the long diameter of the eyes being vertical and the smallest end upward, so that by vertical movement of the slide any shaft that will pass through the eyes may be retained securely in position in rests 31. I have shown the slides as retained in position by thumb-nuts 35, (see Fig. 2,) engaging bolts 36, which extend from arms 30 and pass through slots 37 in the slides.

38 (see Fig. 4) denotes the straight stationary cutter, and 39 the spiral cutters, which are carried by revoluble cutter-holder D.

I have shown the cutter-guide 13 as adjustably secured to arm 12 of frame E by means of a thumb-nut 40 engaging a bolt 41, which extends rigidly from the arm and passes through a slot 42 in the guide.

The operation will be readily understood from the drawings. Suppose that it is desired to sharpen the spiral cutters upon the revoluble cutter-holder B of a lawn-mower. The shaft of cutter-holder B is placed in rests 31, the cross-pieces 18 of carriage F being moved toward or from each other, if necessary, and then locked in position by tightening set-screw 21. Shaft 32 is retained in position in the rests by adjustment of slides 33, the ends of the shaft lying in the oval eyes in said slides. The cutters are placed in proper position relative to the grinding-wheel, in case change of adjustment is required, by loosening thumb-nuts 29 and moving the carriage, with the cutter-holder thereon, toward or from the grinding-wheel. Having placed the carriage in proper position and locked it there by tightening thumb-nuts 29, cutter-guide 13 may be placed in engagement with one of the spiral cutters 39 on revoluble cutter-holder D, as clearly shown in Fig. 3, and locked there by tightening thumb-nut 40, as will be readily understood from Fig. 3 in connection with Fig. 4. Having adjusted the revoluble cutter-holder and secured it in place, the cutters thereon may be sharpened very quickly. A suitable grinding-wheel is caused to rotate, and the carriage is moved longitudinally on frame E by hand. The action of cutter-guide 13 is to cause cutter-holder D to rotate as the carriage is moved along the frame, the amount of rotary motion corresponding to the pitch of the spiral of the cutters, so that all portions of the cutting edge of each cutter will be held up to the grinding-wheel and ground uniformly, and the several cutters upon each revoluble holder will be ground exactly alike, a single forward movement only of the carriage being required for each cutter. Having completed a forward movement, the carriage is moved backward until the cutter that has been operated upon has run off the grinding-wheel, and the holder is then given a partial rotation, so as to place another cutter in position to be operated upon, when the operation is repeated as before, the cutter-guide requiring no adjustment after being set the first time.

In order to provide a convenient means for sharpening the straight stationary cutter 38, I provide upon the cross-pieces 18 standards 43, to which cutter carriers 44 are adjustably secured, each carrier being provided with a slot to receive the cutter and a set-screw 45, by which the cutter is held in the slot. The carriers are provided with bolts 46, rigidly secured thereto and which pass freely through the standards. After adjusting the cutter in proper position relatively to the grinding-wheel the carriers are locked in position by tightening thumb-nuts 47 on the bolts.

Having thus described my invention, I claim—

1. A device of the character described comprising a frame, an adjustable guide 13 carried thereby and a sliding carriage F, said carriage consisting of laterally-adjustable cross-pieces and an adjustable tie-bar between the cross-pieces and each cross-piece carrying an arm having means for retaining the shaft of a lawn-mower revoluble cutter-holder.

2. In a device of the character described the combination with a sliding carriage having arms provided with means for retaining the shaft of a lawn-mower revoluble cutter-holder, of a frame consisting of longitudinal strips 10 and cross-pieces 11, said cross-pieces carrying plates 14, and bolts and thumb-nuts whereby the frame may be attached to the bed of a lathe and an adjustable cutter-guide 13 carried by the frame.

3. The combination with a frame as E, of a carriage F adapted to slide thereon, said carriage comprising laterally-adjustable cross-pieces 18, and means for adjustably connecting said cross-pieces and each cross-piece carrying an arm adapted to retain the shaft of a lawn-mower revoluble cutter-holder.

4. The combination with a frame consisting of longitudinal strips 10 and cross-pieces 11, of a carriage consisting of laterally-adjustable cross-pieces 18 having slots 25 and 27, blocks 24 having lugs engaging slots 25, a bolt extending upward through slot 27 and a thumb-nut 29 engaging said bolt, each of said cross-pieces having an arm provided with means for holding the shaft of a lawn-mower revoluble cutter-holder.

5. In a device of the character described the combination with a frame, of a carriage comprising laterally-adjustable cross-pieces 18 and an adjustable tie-bar between said cross-pieces, arms extending upward from said cross-pieces and having rests to receive the shaft of a lawn-mower revoluble cutter-holder and vertically-adjustable slides 33 having oval eyes through which said shaft may pass and be held in position in the rests.

6. In a device of the character described the combination with a frame, of a longitudinally-movable carriage, laterally-adjustable cross-pieces on said carriage and means for securing the straight, stationary cutter and the revoluble cutter-holder of a lawn-mower upon said cross-pieces while being sharpened.

In testimony whereof I affix my signature in presence of two witnesses.

SAMUEL E. LOUDEN.

Witnesses:
A. M. WOOSTER,
S. W. ATHERTON.